(12) United States Patent
Vander Sluis

(10) Patent No.: US 9,272,671 B2
(45) Date of Patent: Mar. 1, 2016

(54) DISPLAY SCREEN ARRANGEMENT AND METHOD OF ASSEMBLY

(71) Applicant: Faurecia Interior Systems, Inc., Auburn Hills, MI (US)

(72) Inventor: Daniel Vander Sluis, Rochester Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 176 days.

(21) Appl. No.: 13/929,850

(22) Filed: Jun. 28, 2013

(65) Prior Publication Data

US 2015/0002991 A1   Jan. 1, 2015

(51) Int. Cl.
*B60R 11/02* (2006.01)
*B60R 7/04* (2006.01)
*B60K 35/00* (2006.01)
*B60K 37/04* (2006.01)

(52) U.S. Cl.
CPC .............. *B60R 11/0235* (2013.01); *B60K 35/00* (2013.01); *B60K 37/04* (2013.01); *B60R 7/04* (2013.01); *B60K 2350/405* (2013.01); *Y10T 29/49826* (2015.01)

(58) Field of Classification Search
None
See application file for complete search history.

(56) References Cited

U.S. PATENT DOCUMENTS

| | | | | |
|---|---|---|---|---|
| 2002/0149544 | A1* | 10/2002 | Rosen | B60K 35/00 345/6 |
| 2005/0254202 | A1* | 11/2005 | Chen | B60R 11/0235 361/679.27 |
| 2009/0161302 | A1* | 6/2009 | Ferren | B60K 35/00 361/679.01 |
| 2011/0102198 | A1* | 5/2011 | Deleris | B64D 43/00 340/971 |
| 2012/0212397 | A1* | 8/2012 | Lock | G09G 3/20 345/1.3 |
| 2012/0268665 | A1* | 10/2012 | Yetukuri | B60K 35/00 348/837 |

FOREIGN PATENT DOCUMENTS

| | | |
|---|---|---|
| EP | 0675019 A1 | 10/1995 |
| JP | 9193718 A | 7/1997 |
| JP | 10217804 A | 8/1998 |
| JP | 2008132872 A | 6/2008 |

\* cited by examiner

*Primary Examiner* — Kathy Wang-Hurst
*Assistant Examiner* — Douglas Wilson
(74) *Attorney, Agent, or Firm* — Ingrassia Fisher & Lorenz PC

(57) ABSTRACT

A display screen arrangement is disclosed herein. The arrangement includes, but is not limited to a concealable feature adapted to be mounted to an interior surface of a vehicle. The arrangement further includes, but is not limited to, a display screen that is adapted to be mounted to the interior surface of the vehicle proximate the concealable feature. The display screen has a first end and a second end and is configured to move between a retracted position and a deployed position. The first end and the second end are disposed in a first position relative to one another when the display screen is in the deployed position and the first end and the second end are disposed in a second position relative to one another when the display screen is in the retracted position and/or when the display screen transitions between the deployed position and the retracted position.

14 Claims, 12 Drawing Sheets

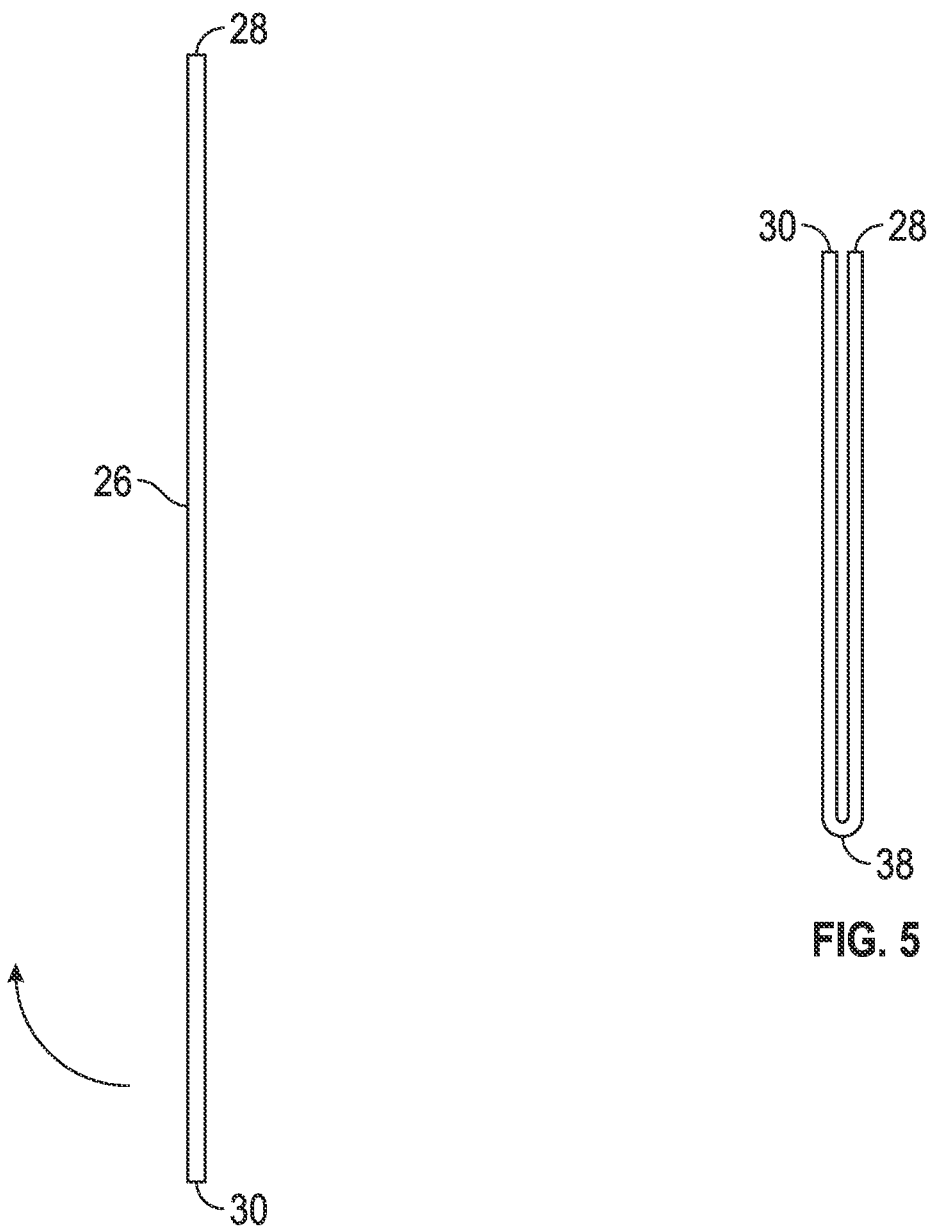

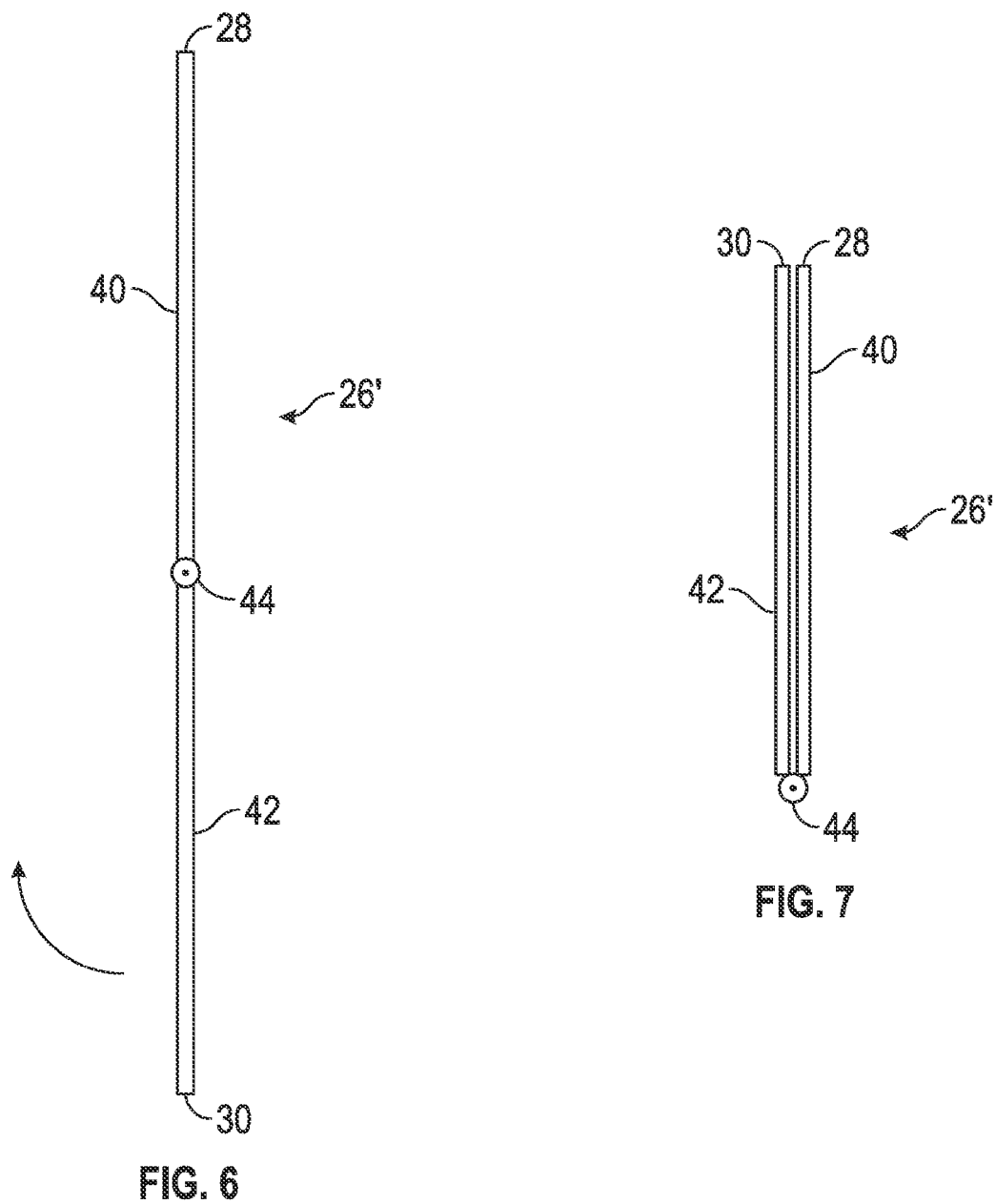

DISPLAY SCREEN ARRANGEMENT AND METHOD OF ASSEMBLY

TECHNICAL FIELD

The technical field generally relates to vehicles, and more particularly relates to a display screen arrangement for use in a vehicle and a method of assembling a display screen arrangement.

BACKGROUND

The presence of display screens, touch screens, and the like have become commonplace in modern vehicles. Such screens provide drivers and vehicle occupants with a means to receive information and with a means to exercise control over various vehicle components, in addition to facilitating other activities.

Despite their utility, some vehicle owners may find the presence of such screens in the vehicle interior to be aesthetically displeasing. Additionally, the display screen has traditionally been statically mounted in a vehicle's instrument panel and therefore consumes surface area that could be used for other purposes.

To address aesthetic and packaging considerations, some vehicle manufacturers have mounted movable display screens in their vehicle's interiors. In some examples, the display screen may be mounted on a rail or a track and may slide (translate) out to protrude from an instrument panel when the display screen is needed and may slide in and retract to a concealed position within the instrument panel when the display screen is not needed. In other examples, complicated mechanisms are used to permit the display to rotate in and out of a viewing position. For example, Japanese patent JP10217804, issued to Nissan Motor Company discloses a monitor that is housed in an instrument panel and that can be selectively rotated into position when desired. While this solution addresses the aesthetic concerns some vehicle owners have, it does not address the concerns which arise out of a display screen's consumption of packaging space. As is clear from the figures of JP10217804, the display screen and the mechanism that allows it to move between a stowed position and a display position is considerable, leaving virtually no room behind the display screen for the placement of a storage bin or other user accessible element.

Other manufacturers have gone in a different direction and have pivotally mounted their display screens in the vehicle's interior in a position directly over another feature such as a storage bin. To access the storage bin, a vehicle occupant need only pivot the display screen out of the way. While this addresses the packaging space issue that typically arises when a display screen is included in a vehicle interior, it does not address the aesthetic issues caused by the presence of a continuously visible display screen in a vehicle interior.

Accordingly, it would be desirable to provide a display screen in a vehicle interior that addressed both the above described aesthetic concerns as well as the above described package space concerns. Furthermore, other desirable features and characteristics will become apparent from the subsequent detailed description and the appended claims, taken in conjunction with the accompanying drawings and the foregoing technical field and background.

SUMMARY

A display screen arrangement and a method of assembling the display screen arrangement are disclosed herein.

In a first, non-limiting embodiment, the display screen arrangement includes, but is not limited to, a concealable feature that is adapted to be mounted to an interior surface of the vehicle. The display screen arrangement further includes, but is not limited to, a display screen that is adapted to be mounted to the interior surface of the vehicle proximate the concealable feature. The display screen has a first end and a second end. The display screen is configured to move between a retracted position and a deployed position. The first end and the second end are disposed in a first position relative to one another when the display screen is in the deployed position. The first end and the second end are disposed in a second position relative to one another when the display screen is in the retracted position and/or when the display screen transitions between a deployed location and a retracted location.

In another non-limiting embodiment, the method includes, but is not limited to the steps of providing a display screen having a first end and a second end. The first end and the second end are disposed in a first position relative to one another when the display screen is in a deployed position. The first end and the second end are disposed in a second position relative to one another when the display screen is in a retracted position and/or when the display screen transitions between the retracted position and the deployed position. The method further includes, but is not limited to, assembling the display screen to an interior of a vehicle in a position proximate a concealable feature such that the display screen will conceal the concealable feature when the display screen is in the deployed position and such that the display screen will expose the concealable feature when the display screen is in the retracted position.

DESCRIPTION OF THE DRAWINGS

One or more embodiments will hereinafter be described in conjunction with the following drawing figures, wherein like numerals denote like elements.

FIG. 4 is a side view of an exemplary embodiment of a display screen for use with the display screen arrangement of FIG. 1 while the display screen is disposed in the deployed position;

FIG. 5 is a side view of the display screen of FIG. 4 while the display screen is disposed in the retracted position;

FIG. 6 is a side view of another exemplary embodiment of a display screen for use with the display screen arrangement of FIG. 1 while the display screen is disposed in the deployed position;

FIG. 7 is a side view of the display screen of FIG. 6 while the display screen is disposed in the retracted position;

DETAILED DESCRIPTION

Figure 1:
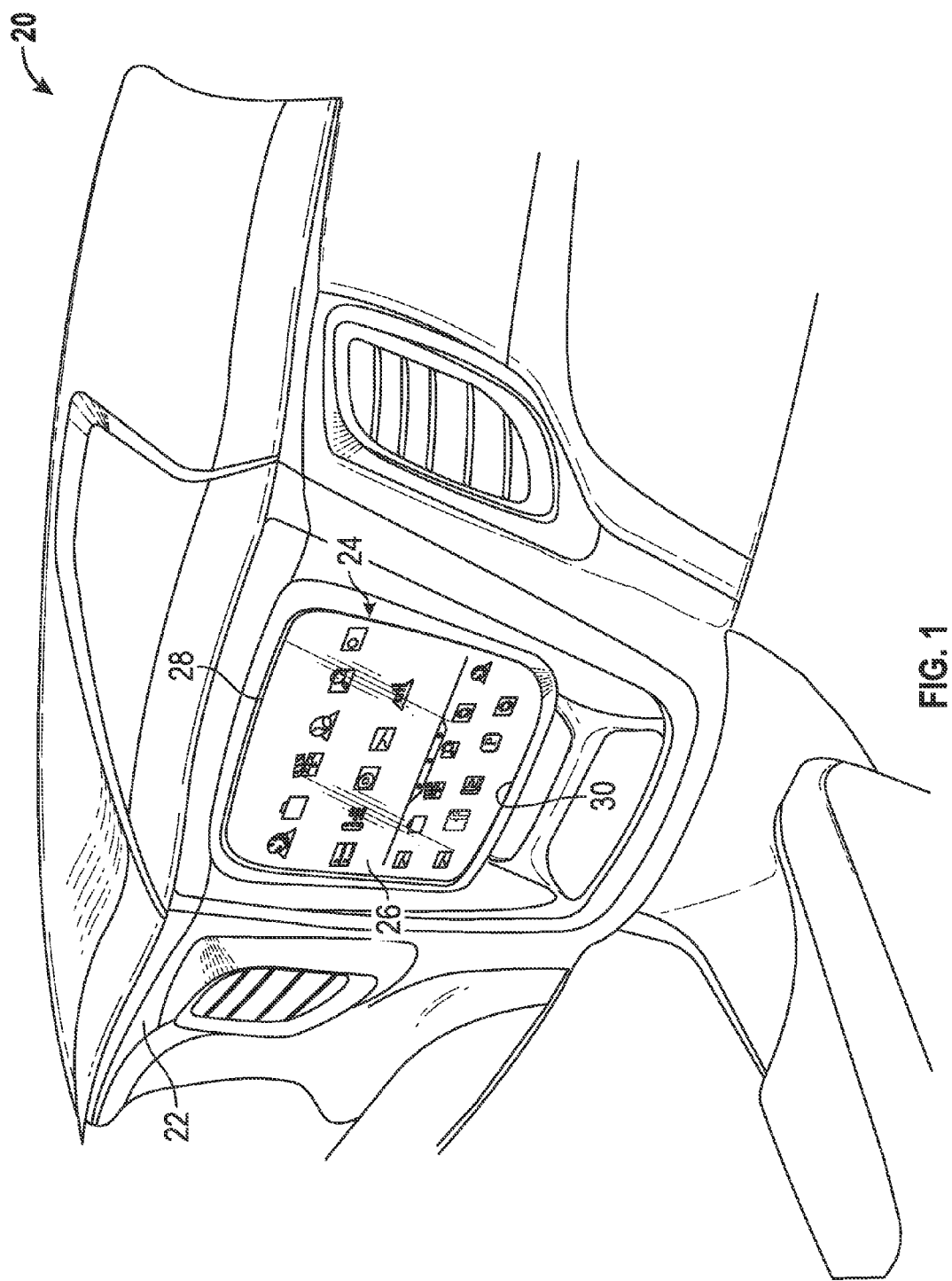
FIG. 1 is a perspective view illustrating an exemplary embodiment of a display screen arrangement made in accordance with the teachings of the present disclosure while the display screen is disposed in a deployed position.

The following detailed description is merely exemplary in nature and is not intended to limit application and uses. Furthermore, there is no intention to be bound by any expressed or implied theory presented in the preceding technical field, background, brief summary or the following detailed description.

An improved display screen arrangement and method of assembly are disclosed herein. In a non-limiting embodiment, the display screen arrangement includes, but is not limited to, a reconfigurable display screen that is capable of folding or otherwise selectively changing its form factor (e.g., from planar to non-planar). In some embodiments, the display screen may be of a flexible construction. Display screens having a flexible construction are known in the art. For example, flexible Active-Matrix Organic Light-Emitting Diode (AMOLED) display screens are known in which AMOLED displays are built directly onto a flexible plastic substrate yielding a display screen capable of flexing, bending, twisting, folding, rolling and the like. Flexible screen technology is also disclosed in U.S. Pat. No. 7,777,856 issued to Silverbrook, on Aug. 17, 2010, the disclosure of which is hereby incorporated herein by reference in its entirety. In other embodiments, the display screen may be comprised of multiple screens that are connected to one another via one or more hinges or other flexible structures and which aggregate to form a composite screen displaying a composite image. Any other suitable technology that enables a display screen to be reconfigured from one form (e.g., a planar form) to another form (e.g., a non-planar form, a curved form, a folded form, or the like) may also be employed.

Configured in this manner, the display screen can be selectively manipulated to assume either a retracted position or a deployed position. While in the deployed position, the display screen may take on a planar configuration or any other configuration suitable for displaying content to a vehicle occupant. While in the retracted position, the display screen takes on a non-planar configuration (e.g., folded, rolled).

In accordance with the display screen arrangement of the present disclosure, the display screen is configured to be mounted to an interior surface of a vehicle in a position proximate a concealable element (e.g., a storage bin, a human-machine interface). A portion of the display screen will cover the concealable element when the display screen is in the deployed position. When the display screen is in the retracted position, the portion of the display screen that had previously covered the concealable element is moved to a position that exposes the concealable element. In this manner, a user can selectively expose or conceal the concealable element.

The display screen arrangement of the present disclosure can be selectively viewed by a driver or other occupant of a vehicle when needed and can be easily and inconspicuously moved out of the way to access to the concealable element when such access is needed. The display screen arrangement of the present disclosure eliminates the need for complicated mechanical mechanisms to move the display screen between a retracted and deployed position and consumes less space than conventional retractable and deployable display screens.

In some embodiments, a back surface of the display screen may have an appearance that blends with the surrounding surfaces of the vehicle interior. For example, in a vehicle interior having a wood grain finish, the back surface of the folding portion of the display screen may have a wood grain finish that is consistent with the surrounding wood grain finish. In other embodiments, the back surface of the folding portion of the display screen may have HMI interfaces or even a secondary display screen. This allows the display screen arrangement to perform various functions and/or to display information to a vehicle occupant even when the display screen retracted to provide access to the concealable element.

An additional advantage of the display screen arrangement disclosed herein is that the display screen may be configured to move between a retracted location (e.g., a location where the display screen is at least partially hidden from view) and a deployed location (e.g., a location where the display screen is in full view of a vehicle occupant) while still in the retracted position (e.g., with one end folded over the other end). For example, the display screen may be configured to translate while it is folded. The display screen may be further configured to pivot while it is folded. Such a configuration provides an opportunity to add a second concealable element to the vehicle interior (e.g., a double bin). In this configuration, the display screen may be recessed between the two concealable elements (e.g, the retracted location). The display screen may be translated or moved to the deployed location and pivoted to conceal one concealable element while permitting access to the other concealable element. Alternatively, once in the deployed location, the display screen may be moved into its deployed position wherein the display screen will conceal both concealable elements.

A greater understanding of the display arrangement described above, as well as a method for assembling the display arrangement may be obtained through a review of the illustrations accompanying this application together with a review of the detailed description that follows.

FIG. 1 is a perspective view illustrating a vehicle interior 20. Vehicle interior 20 includes an instrument panel 22 to which an exemplary embodiment of a display screen arrangement 24 is mounted. Display screen arrangement 24 includes a display screen 26 having an upper end 28 and a lower end 30. Display screen arrangement 24 further includes a concealable element (a bin, see FIG. 2) disposed behind display screen 26.

In the embodiment illustrated in FIG. 1, display screen 26 is a flexible display screen that is capable of folding or otherwise changing its form factor. In other embodiments, a composite display screen may be employed instead of a flexible display screen without departing from the teachings of the present disclosure.

Display screen 26 is depicted in FIG. 1 in a deployed position (e.g., arranged to display information to a vehicle occupant). While in the deployed position, upper end 28 and lower end 30 are separated by a distance equal to the vertical length of display screen 26. As will be seen in FIG. 3, when display screen 26 is placed in the retracted position, upper end 28 and lower end 30 will be positioned adjacent one another and separated by substantially no distance. In many embodiments, when display screen 26 is in the deployed position, the distance between upper end 28 and lower end 30 will be greater than the distance between upper end 28 and lower end 30 when display screen 26 is in the retracted position.

Figure 2:
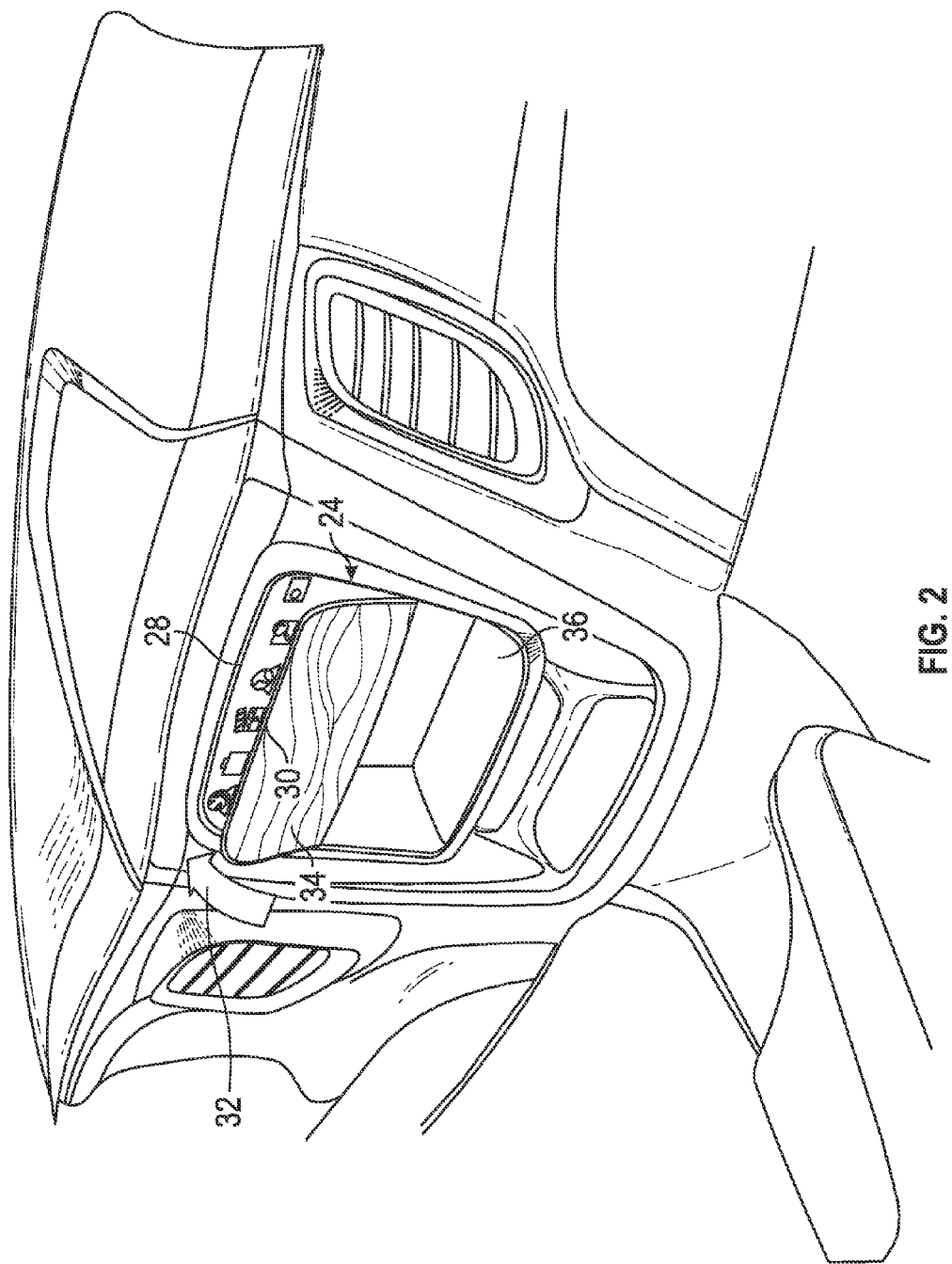
FIG. 2 is a perspective view illustrating the display screen arrangement of FIG. 1 as the display screen transitions from the deployed position to a retracted position.

FIG. 2 is a perspective view illustrating display screen arrangement 24 as the display screen 26 transitions from the deployed position to a retracted position. As illustrated, lower end 30 is folded upwards in the direction indicated by arrow 32 to bring lower end 30 into closer proximity to upper end 28. As further illustrated in FIG. 2, display screen 26 is a flexible display screen that is configured to fold without the assistance of a hinge. In other embodiments, a composite display screen having multiple screens connected via one or more hinges may be employed without departing from the teachings of the present disclosure.

A back end 34 of display screen 26 is visible in FIG. 2. In the illustrated embodiment, back end 34 is configured to comprise a trim panel and has a wood panel overlay to create an aesthetically pleasing appearance. In other embodiments, back end 34 may have any other desirable appearance. In still other embodiments, back end 34 may include HMI interfaces or a small auxiliary display screen or any other desirable component(s).

The concealable element (a bin 36), which is disposed behind display screen 26, is now visible as lower end 30 is folded up and display screen 26 is moved to its retracted position. Bin 36 is configured to store loose articles. Such loose articles are concealed when display screen 26 is in the deployed position and are accessible when display screen 26 is in the retracted position.

Figure 3:
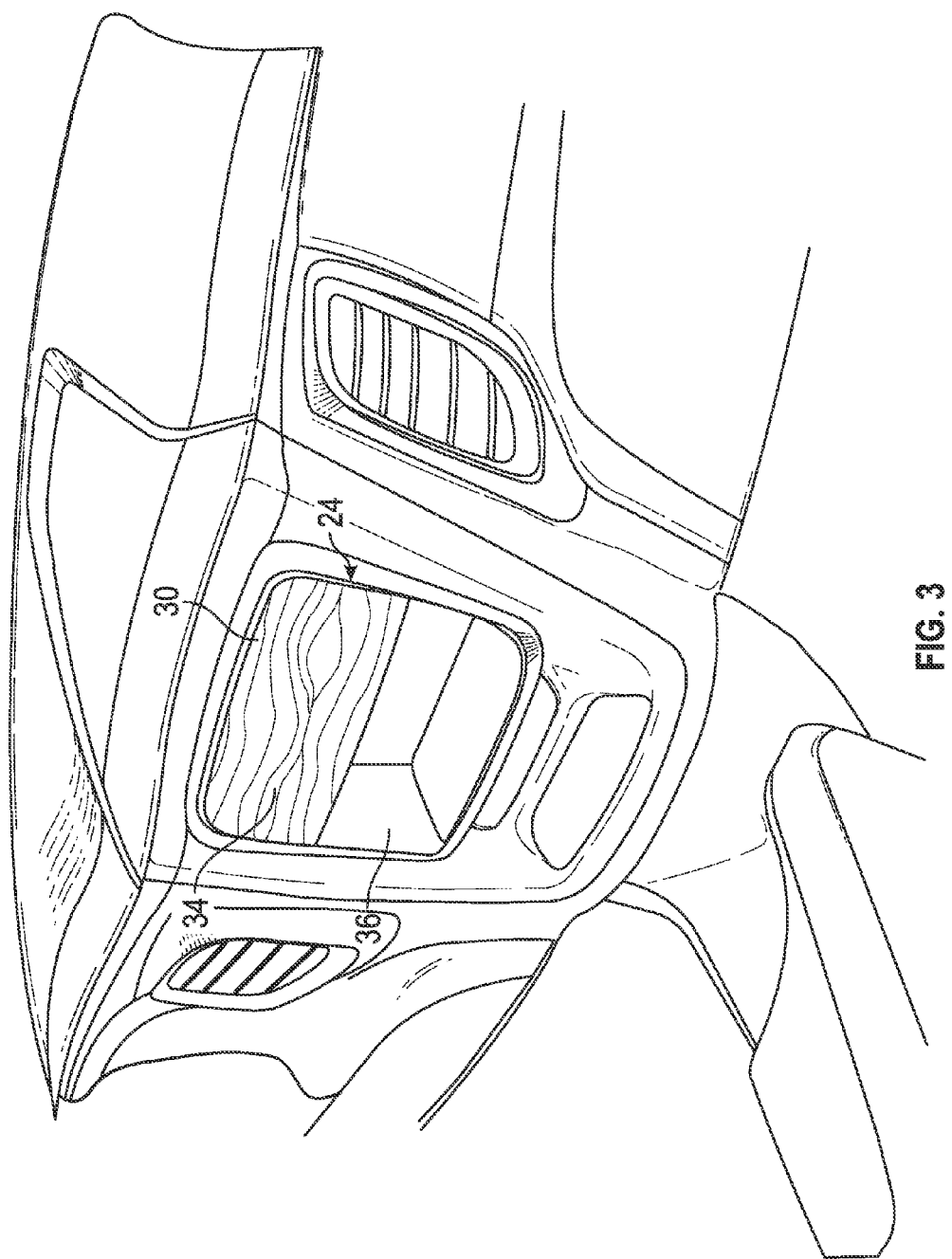
FIG. 3 is a perspective view illustrating the display screen arrangement of FIG. 1 with the display screen disposed in the retracted position.

FIG. 3 is a perspective view illustrating display screen arrangement 24 with display screen 26 situated in the retracted position. While in the retracted position, back end 34 is folded over an upper end of display screen 26 such that lower end 30 and upper end 28 (see FIGS. 1-2) are adjacent one another. In this position, a vehicle occupant has unobstructed access to bin 36 and a front display portion of display screen 26 is completely concealed. Back end 34 creates the appearance of an interior trim component which a vehicle occupant may find more aesthetically pleasing than a display screen.

With continuing reference to FIGS. 1-3, FIG. 4 is a side view illustrating display screen 26 by itself, without the other components of display screen arrangement 24. Display screen 26 is disposed in the deployed position. While in the deployed position, display screen 26 is substantially planar in configuration and upper end 28 and lower end 30 are disposed as far away from one another as possible. In other embodiments, display screen 26 may have some curvature (i.e., it may be non-planar) while in the deployed position. For example, in some embodiments, it may be desirable to impart a slight concave or a slight convex curvature to display screen 26 based on its position within the vehicle interior and its exposure to sunlight or other environmental factors.

FIG. 5 is a side view illustrating display screen 26 while display screen 26 is disposed in the retracted position. As illustrated, display screen 26 has been folded such that upper end 28 and lower end 30 are disposed adjacent one another. While in the retracted position, display screen 26 is folded at a central portion 38 of display screen 26. In some embodiments, central portion 38 may have a radius as small as 2 mm while folded.

With continuing reference to FIGS. 1-3, FIG. 6 is a side view illustrating another exemplary embodiment of a display screen 26' for use with display screen arrangement 24. Display screen 26' is a composite screen comprised of two smaller screens, a sub-screen 40 and a sub-screen 42, joined together via a hinge 44. Hinge 44 permits the sub-screens 40, 42 to pivot with respect to one another and permits sub-screen 42 to be folded over sub-screen 40. In FIG. 6, display screen 26' is illustrated in a deployed position wherein sub-screen 40 and sub-screen 42 are unfolded such that display screen 26' assumes a substantially planar configuration and such that upper end 28 and lower end 30 are disposed as far apart from one another as possible. In other embodiments, it may be desirable to orient sub-screen 40 and sub-screen 42 at a slight angle with respect to one another when display screen 26' is disposed in the deployed position based on the position of display screen 26' within the vehicle interior and its exposure to sunlight or other environmental factors.

FIG. 7 is a side view illustrating display screen 26' while display screen 26' is disposed in the retracted position. In the retracted position, sub-screen 42 has been folded over sub-screen 40 such that lower end 30 is disposed adjacent upper end 28.

Figure 8:
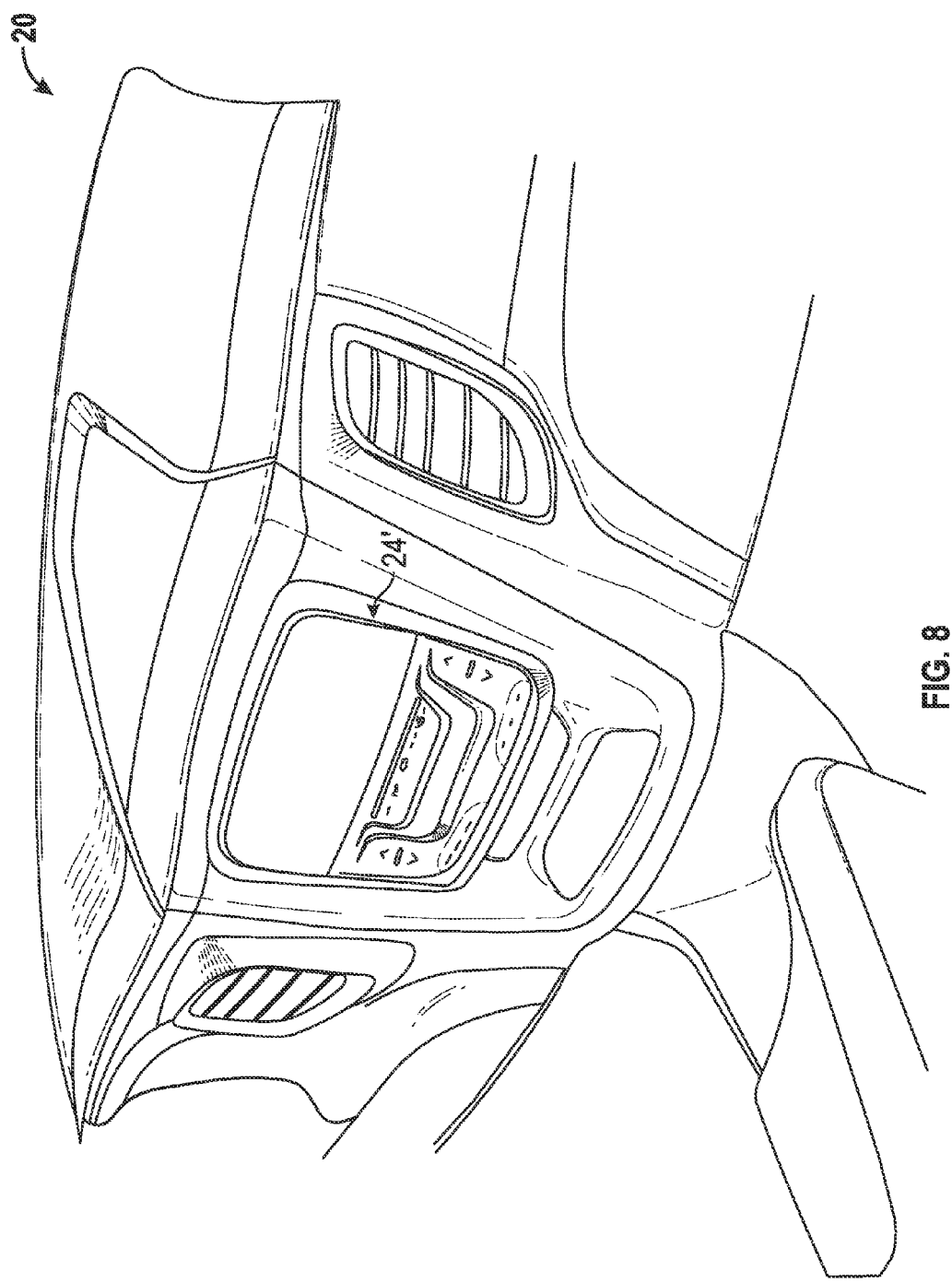
FIG. 8 is a perspective view illustrating another exemplary embodiment of a display screen arrangement made in accordance with the teachings of the present disclosure while the display screen is disposed in the retracted position.

FIG. 8 is a perspective view illustrating another exemplary embodiment of a display screen arrangement 24' for use in vehicle interior 20. With continuing reference to FIGS. 1-3, display screen arrangement 24' is very similar to display screen arrangement 24, the one distinction being that display screen arrangement 24' includes an HMI panel 46 as the concealable element whereas display screen arrangement 24 includes bin 36 as the concealable element.

Figure 9:
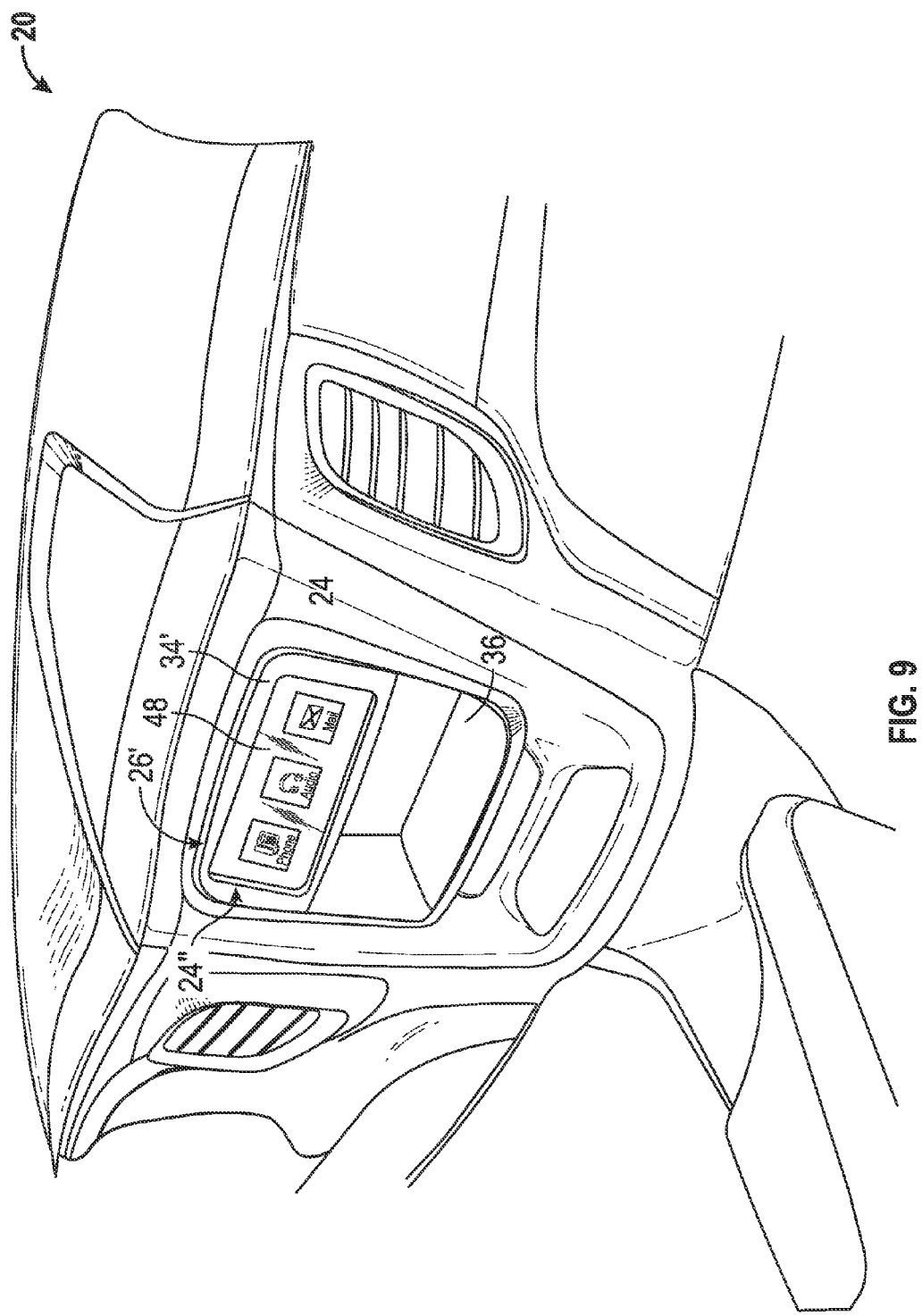
FIG. 9 is a perspective view illustrating another exemplary embodiment of a display screen arrangement made in accordance with the teachings of the present disclosure while the display screen is disposed in the retracted position.

FIG. 9 is a perspective view illustrating another exemplary embodiment of a display screen arrangement 24" for use in vehicle interior 20. Display screen arrangement 24" includes a display screen 26'. Display screen 26' includes back end 34' that includes an auxiliary display screen 48. Thus, when display screen 26' is in the retracted position (as illustrated in FIG. 9), a vehicle occupant has access to bin 36 and can simultaneously view information presented on auxiliary display screen 48.

Figure 10:
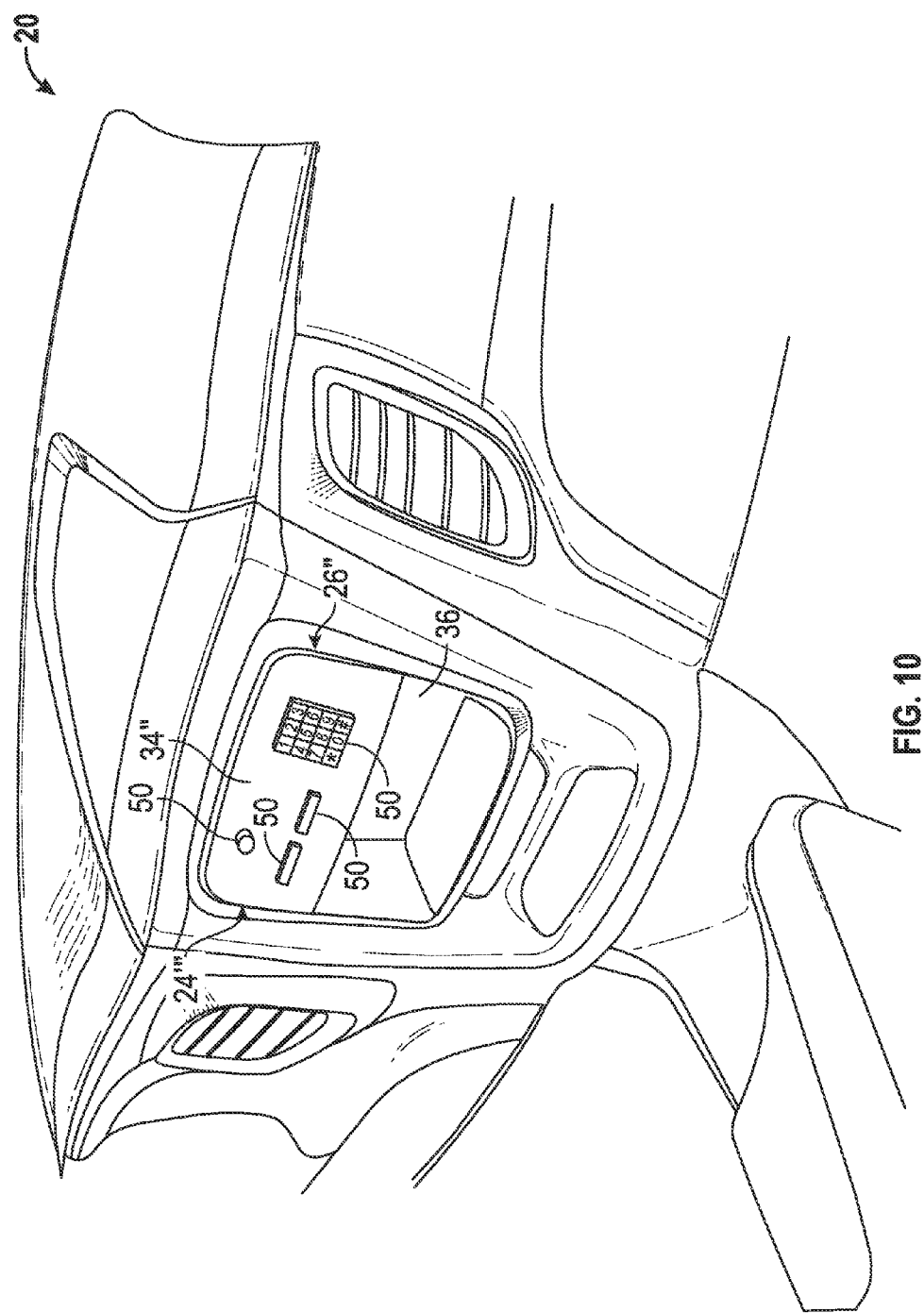
FIG. 10 is a perspective view illustrating another exemplary embodiment of a display screen arrangement made in accordance with the teachings of the present disclosure while the display screen is disposed in the retracted position.

FIG. 10 is a perspective view illustrating another exemplary embodiment of a display screen arrangement 24"' for use in vehicle interior 20. Display screen arrangement 24' includes a display screen 26". Display screen 26" includes back end 34" that includes various HMI input devices 50. Thus, when display screen 26" is in the retracted position (as illustrated in FIG. 10), a vehicle occupant has access to bin 36 and can simultaneously provide inputs into one or more vehicle systems via the various HMI input devices 50.

Figure 11:
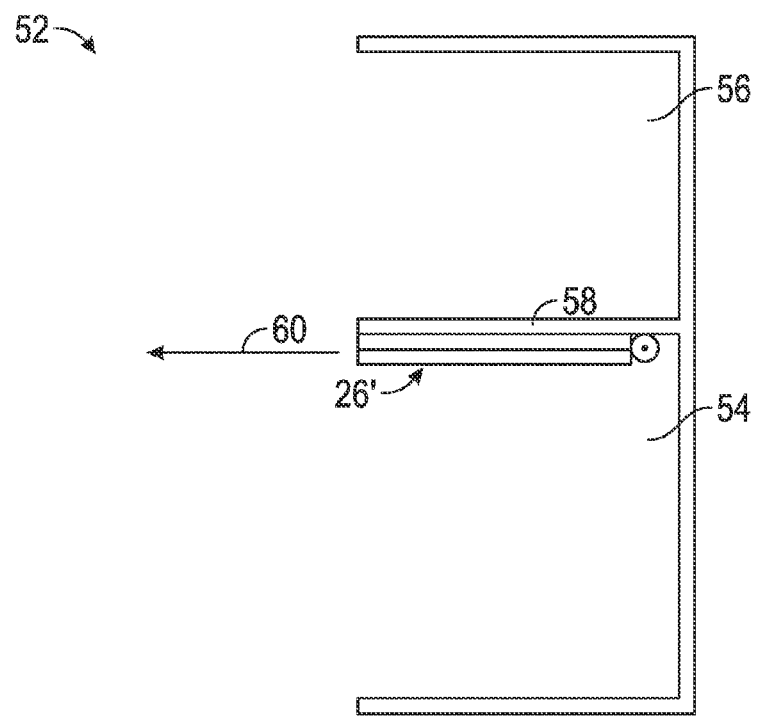
FIG. 11 is a schematic side view illustrating another exemplary embodiment of a display screen arrangement made in accordance with the teachings of the present disclosure while the display screen is disposed in the retracted position and located in a retracted location.

FIG. 11 is a schematic side view illustrating another exemplary embodiment of a display screen arrangement 52 for use in a vehicle interior. Display screen arrangement 52 includes not one, but two concealable elements —a bin 54 and a bin 56.

Display screen arrangement 52 further includes a display screen 26' (a composite screen). It should be understood that although display screen arrangement 52 is illustrated as including display screen 26', in other embodiments, display screen arrangement 52 may include display screen 26 (see FIGS. 1-5) without departing from the teachings of the present disclosure.

In FIG. 11, display screen 26' is illustrated in the retracted position and is located at a retracted location. While in the retracted location, display screen 26' is positioned within bin 54 adjacent to a central dividing wall 58, essentially placing display screen 26' between bin 54 and 56. In other embodiments, a compartment may be disposed between bin 54 and bin 56 to house display screen 26'. While in the retracted position and in the retracted location, display screen 26' is minimally visible to a vehicle occupant and provides the vehicle occupant with unobstructed access to bin 54 and 56.

Figure 12:
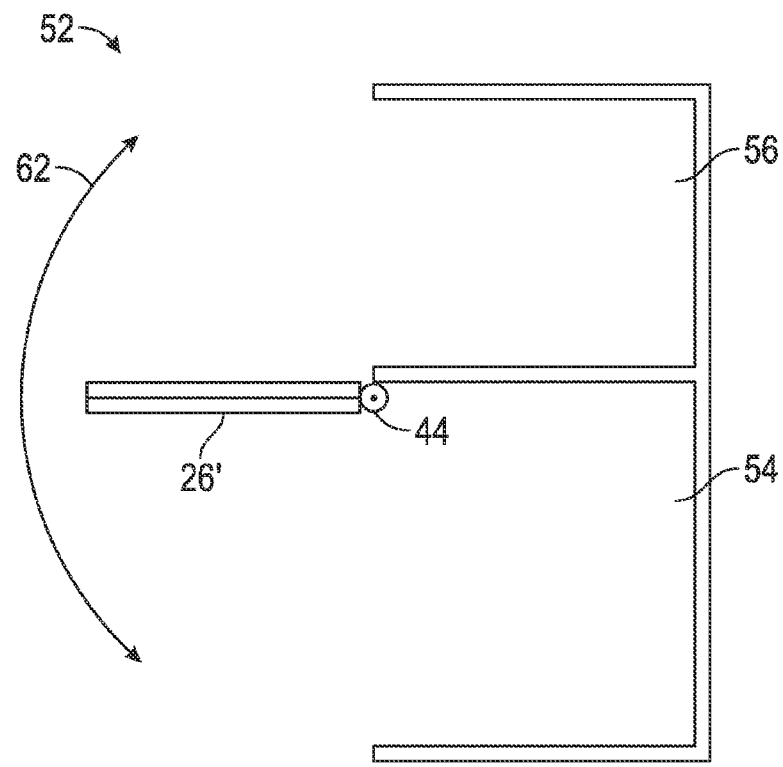
FIG. 12 is a schematic view illustrating the display screen arrangement of FIG. 11 while the display screen is positioned in the retracted position and transitioning between the retracted location and a deployed location.
Figure 13:
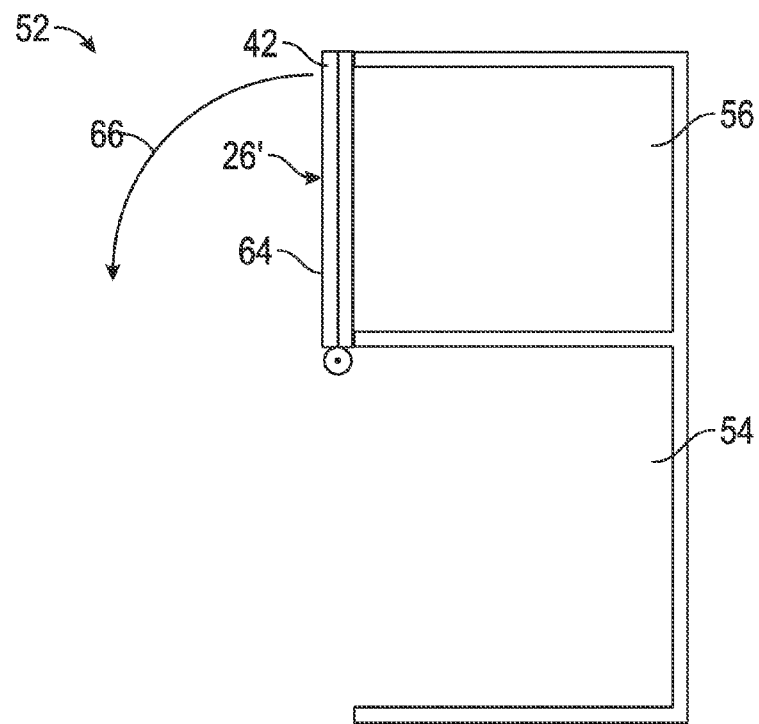
FIG. 13 is a schematic view illustrating the display screen arrangement of FIG. 11 while the display screen is positioned in the retracted position and located in the deployed location.
Figure 14:
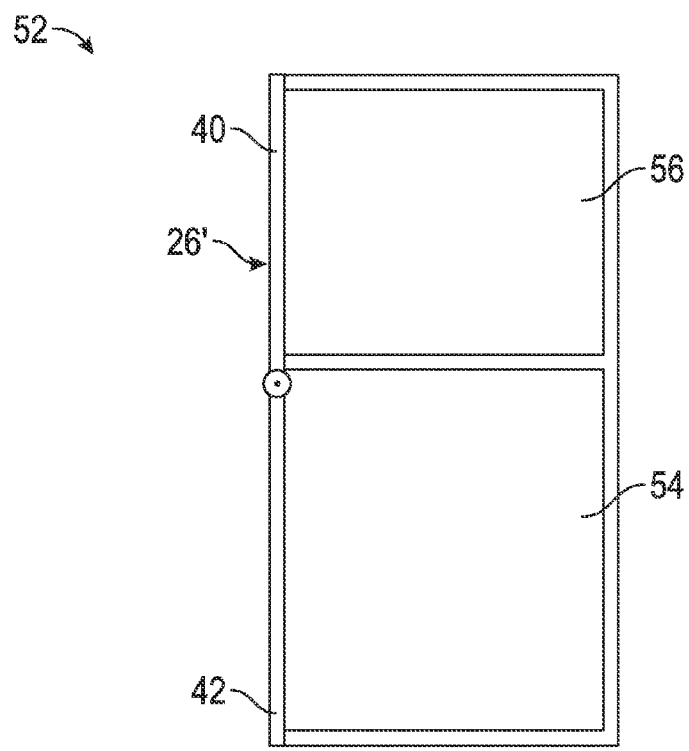
FIG. 14 is a schematic view illustrating the display screen arrangement of FIG. 11 while the display screen is positioned in the deployed position and is located in the deployed location.

In the illustrated embodiment, display screen 26' is configured to slide in the direction indicated by arrow 60 from the retracted location (illustrated in FIG. 11) to the deployed location (illustrated in FIGS. 12-14). In some embodiments, display screen 26' may be mounted on rails to facilitate such sliding motion. In other embodiments, any other suitable mechanism that facilitates translation of display screen 26' to and from the retracted location may also be implemented without departing from the teachings of the present disclosure.

FIG. 12 is a schematic view illustrating display screen arrangement 52 after it has moved from the retracted location (see FIG. 11) to a deployed location. Although display screen 26' is in the deployed location, it remains in the retracted position (e.g., folded). While in the deployed location, display screen 26' is free to swivel about hinge 44 in the directions indicated by arrow 62. Configured in this manner, display screen 26' can be rotated into a position that covers either bin 54 or bin 56, thus permitting a user to selectively conceal the contents of either bin.

FIG. 13 is a schematic view illustrating display screen arrangement 52 after display screen 26' has been rotated into a position that covers bin 56. Display screen 26' remains in the retracted position (e.g., folded). In some embodiments, a back end 64 may have a decorative surface, HMI inputs, an auxiliary display screen or any other desirable feature. To move display screen 26' from the retracted position to the deployed position, sub-screen 42 is rotated in the direction indicated by arrow 66.

FIG. 14 is a schematic view illustrating display screen arrangement 52 after sub-screen 42 has been rotated do cover bin 54. With sub-screen 42 positioned in the manner illustrated, display screen 26' is now in the deployed position. While in the deployed position, both bins 54 and 56 are covered and a vehicle occupant is able to view information displayed on display screen 26'. To access either bin 54 or bin 56, the vehicle user need only rotate either sub-screen 42 upwards towards sub-screen 40 or rotate sub-screen 40 downwards towards sub-screen 42. To return display screen 26' to the retracted location, a user need only fold sub-screen 40 and sub-screen 42 towards a middle position such that they overlay one another and then push display screen 26' to cause it to translate back to its retracted location.

Figure 15:
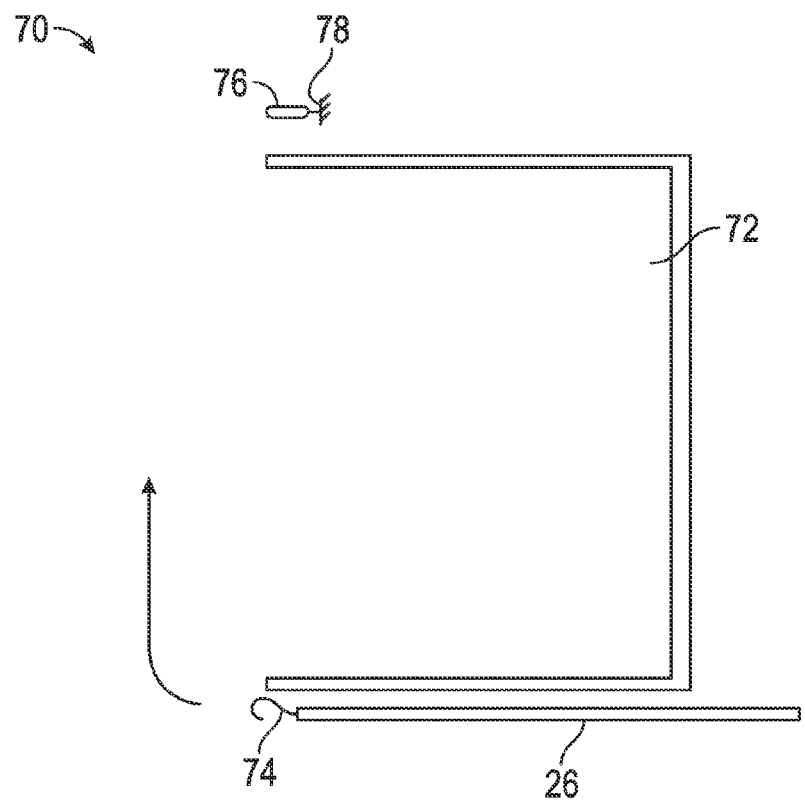
FIG. 15 is a schematic view illustrating another exemplary embodiment of a display screen arrangement made in accordance with the teachings of the present disclosure while the display screen is disposed in a retracted location.

FIG. 15 is a schematic view illustrating another exemplary embodiment of a display screen arrangement 70 for use in a vehicle interior. Display screen arrangement 70 includes display screen 26 which comprises a flexible screen. It should be understood that although display screen arrangement 70 is illustrated as including a flexible display screen, in other embodiments, display screen arrangement 70 may include a composite display screen without departing from the teachings of the present disclosure.

Display screen arrangement 70 further includes a concealable element. In the illustrated embodiment, the concealable element comprises a bin 72. In other embodiments, the concealable element may comprise HMI inputs or any other suitable item. In FIG. 15, display screen 26 is disposed in a retracted location in an area beneath bin 72. While in the retracted location, a vehicle occupant has unobstructed access to bin 72. In other embodiments, the retracted location for display screen 26 may be above bin 72 or to one side or the other of bin 72.

Unlike the display screen arrangements described above wherein the display screens move between a retracted position and a deployed position, with respect to display screen arrangement 70, display screen 26 remains substantially in a deployed position throughout its life cycle and instead moves between a retracted location and a deployed location. In the embodiment illustrated in FIGS. 15-17, display screen 26 is configured to be pulled out of the retracted location and moved to the deployed location in a manner similar to a rolltop desk cover. In this manner, display screen 26 flexes when it is moved between the retracted and deployed location, but remains substantially planar while it is located in both the retracted location and the deployed location. In other embodiments, display screen 26 may be rolled up in substantially the same manner as a window shade while it is in the retracted location and unwound when moved to the deployed location.

In the illustrated embodiment, display screen 26 includes a latch 74. Latch 74 is configured to engage a receiver 76 mounted to an interior surface 78 of a vehicle. In other embodiments, any other mechanism or device suitable for retaining display screen 26 in the deployed location may be employed without departing from the teachings of the present disclosure.

Figure 16:
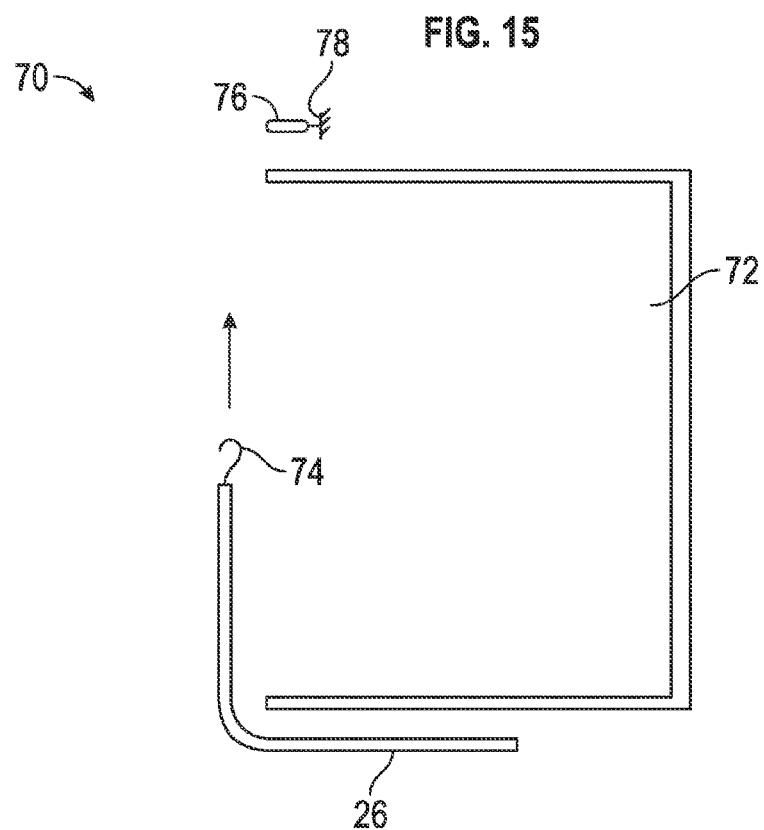
FIG. 16 is a schematic view illustrating the display screen arrangement of FIG. 15 while the display screen transitions between the retracted location and a deployed location.

FIG. 16 is a schematic view illustrating display screen arrangement 70 as display screen 26 transitions between the retracted location and a deployed location. As display screen 26 transitions from the retracted location to the deployed location, it flexes around a corner of bin 72 and assumes a non-planar configuration during this transitional stage.

To move display screen 26 to the deployed location, a user may pull on latch 74 and lift it. In other embodiments, such motion may be automated and/or mechanized. In still other embodiments, any other suitable means for moving display screen 26 from the retracted location to the deployed location may be employed without departing from the teachings of the present disclosure.

Figure 17:
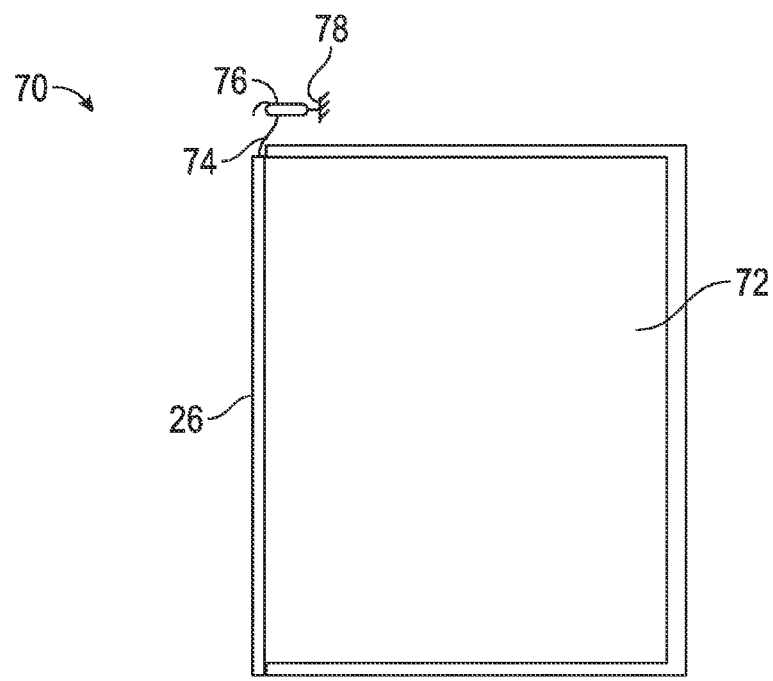
FIG. 17 is a schematic view illustrating the display screen arrangement of FIG. 15 while the display screen is disposed in the deployed location.

FIG. 17 is a schematic view illustrating display screen arrangement 70 after display screen 26 has been moved to the deployed location. Once display screen 26 in the deployed location, display screen 26 returns to a planar configuration and is able to display information to a vehicle occupant. Also, while in the deployed location, display screen 26 covers bin 72, concealing bin 72 and its contents from view.

To retain display screen 26 in the deployed location, latch 74 engages receiver 76. Through such engagement, display screen 26 is supported in the deployed location. To return display screen 26 to the retracted location, a vehicle occupant need only disengage latch 74 from receiver 76 and push display screen 26 back towards the deployed location. In some embodiments, a biasing member (e.g., a spring, an elastic strap) may urge display screen 26 towards the retracted location.

Figure 18:
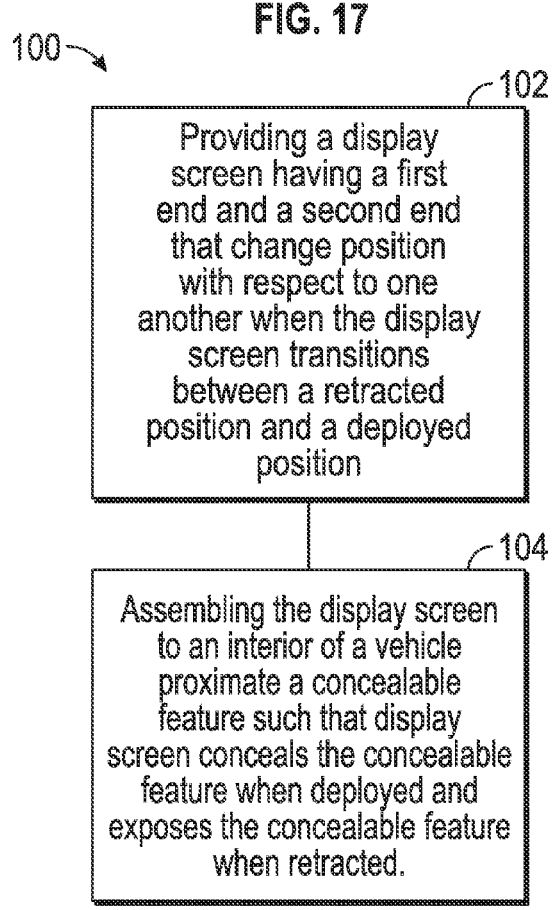
FIG. 18 is a block diagram illustrating an exemplary embodiment of a method for assembling a display screen arrangement.

FIG. 18 is a block diagram illustrating an exemplary embodiment of a method 100 for assembling a display screen arrangement. At step 102, a display screen, such as, but not limited to, display screen 26 or display screen 26', is provided (see FIGS. 1-7). The display screen may be flexible, foldable, or otherwise reconfigurable such that opposite ends of the display screen change position with respect to one another when the display screen moves between a retracted position and a deployed position or when the display screen moves between a retracted location and a deployed location.

At block 104, the display screen is assembled to an interior of a vehicle at a location in close proximity to a concealable feature (e.g., a storage bin, an HMI interface, and the like). When positioning the display screen in the interior of the vehicle, the display screen is positioned such that the display screen will conceal the concealable feature when the display screen is in the deployed position and such that the display screen will expose the concealable feature when the display screen is in the retracted position.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A display screen arrangement comprising:
a concealable feature adapted to be mounted to an interior surface of a vehicle; and
a display screen adapted to be mounted to the interior surface of the vehicle proximate the concealable feature, the display screen having a first end and a second end, the display screen configured to fold substantially in half about a central axis to form a first half and a second half, the display screen being in a retracted position when it is folded in half and the display screen being in a deployed position when it is unfolded, the first end and the second end being spaced apart when the display screen is in the deployed position and the first end and the second end being disposed adjacent to one another when the display screen is in the retracted position the first half covering and concealing the concealable feature when the display screen is in the deployed position and the first half exposing the concealable feature when the display screen is in the retracted position,
wherein the concealable feature comprises a bin.

2. The display screen arrangement of claim 1, wherein the display screen has a planar configuration when in the deployed position and has a non-planar configuration when the display screen is in the retracted position.

3. The display screen arrangement of claim 1, wherein the display screen is configured for mounting to a center console of an instrument panel.

4. The display screen arrangement of claim 1, wherein the first half is distinct from the second half and wherein the first half is connected to the second half via a hinge.

5. The display screen arrangement of claim 1, wherein the display screen comprises a flexible display screen and wherein the first half is integral with the second half.

6. The display screen arrangement of claim 1, wherein the display screen is configured to move between a retracted location and a deployed location while the display screen is in the retracted position.

7. The display screen arrangement of claim 1, wherein the display screen is configured to pivot while the display screen is in the retracted position.

8. The display screen arrangement of claim 1, wherein the display screen is configured to translate and pivot while the display screen is in the retracted position.

9. The display screen arrangement of claim 1, wherein a back side of the second half comprises a trim component.

10. The display screen arrangement of claim 1, wherein a back side of the second half comprises a human-machine interface.

11. The display screen arrangement of claim 1, wherein a back side of the second half comprises a second display screen.

12. The display screen arrangement of claim 1, wherein the concealable feature comprises a first bin and a second bin, and wherein the display screen is configured to selectively cover and conceal the first bin, the second bin, and both the first bin and the second bin.

13. The display screen arrangement of claim 1, wherein the display screen follows an arcuate path when moving between the retracted location and the deployed location.

14. A method of assembling a display screen arrangement, the method comprising the steps of:
providing a display screen having a first end and a second end, the display screen configured to be folded substantially in half about a central axis to form a first half and a second half, the display screen being in a retracted position when the display screen is folded in half, the display screen being in a deployed position when the display screen is unfolded, the first end and the second end being disposed in a spaced apart relationship when the display screen is in a deployed position, and the first end and the second end being disposed adjacent to one another when the display screen is in a retracted position; and
assembling the display screen to an interior of a vehicle in a position proximate a concealable feature such that the display screen will cover and conceal the concealable feature when the display screen is in the deployed position and such that the display screen wilt expose the concealable feature when the display screen is in the retracted position,
wherein the concealable feature comprises a bin.

* * * * *